Figure 1:
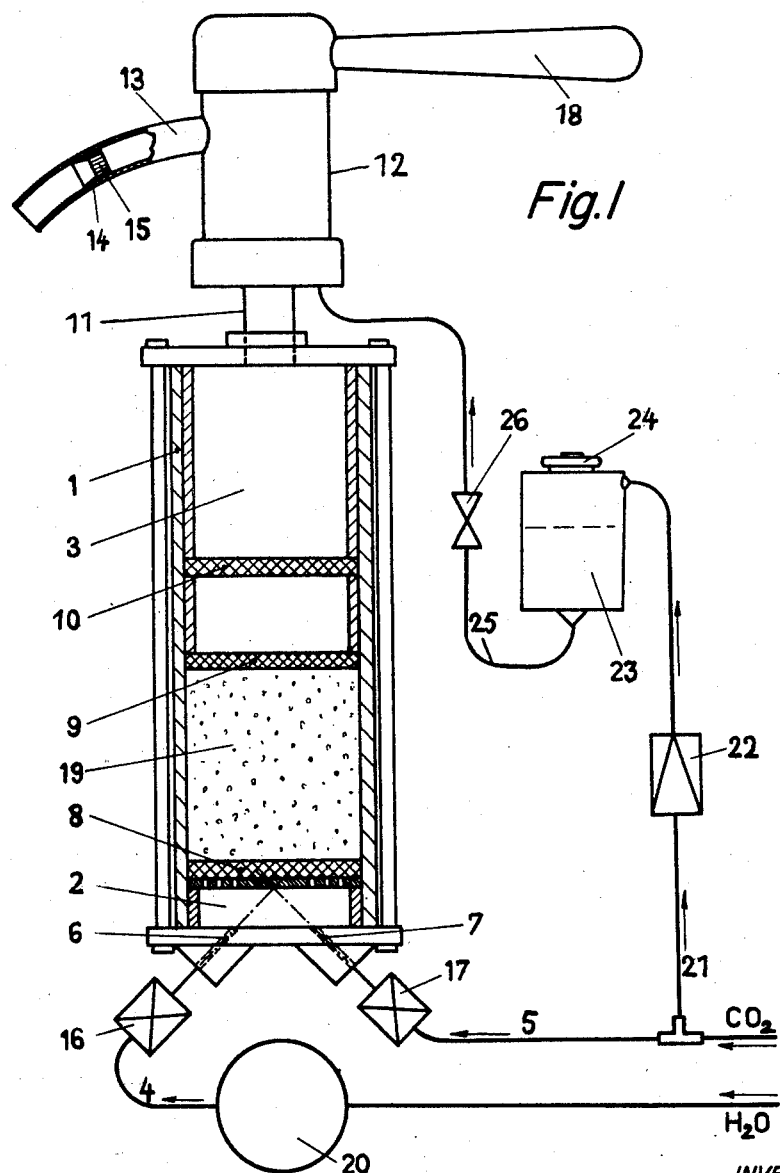

Oct. 7, 1958          F. KÖNIG          2,855,307

PROCESS AND APPARATUS FOR PREPARING CARBONATED LIQUIDS

Filed Nov. 25, 1955

INVENTOR
FRITZ KÖNIG
BY Toulmin & Toulmin
ATTORNEYS

United States Patent Office 2,855,307
Patented Oct. 7, 1958

2,855,307

PROCESS AND APPARATUS FOR PREPARING CARBONATED LIQUIDS

Fritz König, Oberhaching, near Munich, Germany

Application November 25, 1955, Serial No. 549,129

Claims priority, application France November 26, 1954

6 Claims. (Cl. 99—79)

The object of the present invention is to provide a process and an apparatus for producing extraordinarily homogenized carbonated liquors, for adding to the carbonated liquors accurately dosed admixtures and for effecting a continuous pouring of the resultant mixed liquid.

Apparatus has been known for the preparation of liquids containing carbonic acid, wherein water and carbonic acid streams are directed to impinge upon each other through slanting jets in a mixing chamber and become intimately united by correspondingly firmly arranged resistances. It is also known to place obstacles such as shock areas in the paths of the liquid and gas jets. All these measures, however, have certain drawbacks and do not guarantee the production of a carbonated liquor.

For the purpose of admixing to the produced carbonated liquor accurate doses of other liquids, such as fruit juices, both the water, to which carbonic acid had been added, and the fruit juices have heretofore been measured separately and supplied to the mix or discharge valve at the moment when pouring began through the water pipe for carbonic acid pressure. A continuous supply of mixed liquids is, however, impossible according to this process.

In order to eliminate the disadvantages of the known processes and apparatus for preparing carbonated mixed liquids, the present invention proposes to unite a liquid jet and a carbonic acid jet at a single point on a joint shock area in a mixing chamber, then to put in the path of the flowing liquid jet to which carbonic acid has been added, increasing resistances in the form of distributing bodies, such as siliceous grains, sieves, or the like, and finally to add an accurately dosed quantity of an admixture liquid.

For carrying out this process, the present invention proposes to use a mixing chamber provided with a draft valve in which chamber nozzles for the liquor and the carbonic acid are slanted against each other, whereby the axes of said nozzles meet at a common point on a joint shock surface; the latter is provided with a distributing sieve outside the striking range of the liquid and carbonic acid jets. Furthermore, siliceous grains or similar distributing bodies and subsequent throttle sieves are provided on the shock surface, and the penetration cross section decreases in the direction of the flow of the mixture.

With this structure an extraordinarily good homogenizing of the liquid and the carbonic acid is obtained.

A further embodiment of this invention suggests that the feed pipe of the carbonic acid to the mixing chamber be provided with a branch leading over a pressure reduction valve to one or several storage containers for the admixed liquids, whereby derivative conduits are provided on the storage containers for the admixed liquids, said derivative conduits leading to the draft valve by way of metering means.

Furthermore, in order to avoid eventual fluctuation of pressure, a special pump with a pressure compensating chamber is introduced into the liquid feed pipe which leads to the mixing chamber.

On the basis of the present invention, it is not only possible to continuously mix and homogenize liquids of any kind with carbonic acid, but it is also possible to add to the produced liquors accurately dosed additional quantities of fruit juices, essences, or the like, which are optionally variable as to their intensity, and to continuously discharge the resultant mixture.

With the present invention it is possible to also obtain at a very low pressure of, for instance three atmospheres, an intensively carbonated drink which is of good quality—as thorough scientific experiments of academic institutes have proved—as compared to carbonated mixed drinks produced at high pressure. As is known, water could heretofore be mixed with carbonic acid only at high pressures and low temperatures.

Other objects and advantages of this invention will be apparent upon reference to the accompanying description when taken in conjunction with the following drawing, wherein:

Fig. 1 is a vertical sectional view of the apparatus with a schematic diagram of the conduits for the various fluids.

Proceeding to the drawing, there is shown a mixing device 1 which consists of a mixing chamber 2 and a collecting chamber 3. The liquid is supplied through a feed pipe 4, and the carbonic acid through a feed pipe 5. The feed pipes lead to the mixing chamber 2 through the nozzles 6 and 7. The bore hole of the nozzle 6 for the supply of the liquid is greater than the bore hole 7 for the supply of the carbonic acid, whereby the axes of both bore holes are so directed that the jets entering the mixing chamber 2 meet at a common point on a shock surface 8, which is similarly fastened as throttle sieves 9 and 10, and which—by reducing the inside diameter—present an increasing resistance to the flow of the mixture. The collecting chamber 3 has a conduit 11 which leads to a draft valve 12 having an outlet 13. There is a screw cap 14 in the outlet 13 by which it is possible to removably position filtering sieves 15 of varying inside diameters in accordance with the existing pressure proportions in the interior of the mixing apparatus 1. For safety purposes, a check valve 16 is built into the liquid supply pipe 4 and a check valve 17 is also arranged in the carbonic acid supply pipe 5 that a back flow of the mixture from the mixing chamber 2 into either of the supply pipes 4 or 5 is impossible.

When the apparatus is to be operated, the conduit 4 must be connected with a liquid container, and conduit 5 must be connected with a carbonic acid container by a reducing valve. Actuation of the lever 18 of the valve 12 will direct both a liquid jet and a carbonic acid jet into the mixing chamber 2 on account of the pressure in the supply pipes 4 and 5. The liquid and carbonic acid jets will meet at a common point in the middle of the shock surface 8 upon emerging from slanted nozzles 6 and 7, and the two jets will be there jointly atomized, whereby an intimate mixture is achieved in the chamber 2. After the preliminary mixing caused by the atomization in the mixing chamber 2, the mixture is still constantly mixed by the liquid and carbonic acid jets, which latter find their way to the shock surface directly and independently. After flowing through the bore holes of the throttle sieve 8 and through siliceous grains 19 through the single throttle sieves 9 and 10, the mixture enters the collecting chamber 3, and from there, by way of a conduit with delivery valve, it is passed through the filter 15 and then discharged as a sparkling liquid at a fountain.

According to this invention, a pump 20 with an equalizing container is introduced into the water supply pipe 4, which pump makes the apparatus independent of the pressure which exists in the water supply main. Furthermore, the pump 20 with the equalizing container increases the pressure to the required level in cases where the existing water pressure does not suffice for the production of carbonated water. The carbonic acid supply pipe 5 contains a branch 21 which—over a pressure reducing valve 22—leads to one or more storage containers for admixtures, such as fruit juices and the like. A storage container 23, as shown, and any other storage containers, has a suitable structure and is provided with a feed opening which can be closed by the valve 24. A conduit 25 leads from the storage container 23 to a metering device 26 consisting, for instance of a cock or valve, and from there to the draft valve 12.

The apparatus according to the present invention has very important economical advantages. It is thus not only possible to produce with this apparatus extremely well homogenized carbonated liquors, but it is also possible to directly mix and constantly pour these carbonated liquids with accurately metered additional drinks. The apparatus according to this invention can be industrially utilized at a wide range, for instance in the beverage industry and in the laboratory. This apparatus is also, among other purposes, suitable for the mechanical dechlorination of water, whereby, if necessary, a chemical dechlorination is equally possible.

It will be understood that this invention is susceptible to modification in order to adapt it to different usages and conditions, and, accordingly, it is desired to comprehend such modifications within this invention as may fall within the scope of the appended claims.

What is claimed is:

1. In a process for preparing homogenized carbonated liquid, the step of slantingly directing towards each other and to a common surface area a jet of carbonic acid and a jet of a liquid to be carbonated to cause the jets to unite at a common point on the surface area whereby the jets are jointly atomized and a homogenized carbonated liquid is produced.

2. In a process for preparing homogenized carbonated liquid, the step of slantingly directing towards each other and to a common surface area a jet of carbonic acid and a jet of a liquid to be carbonated to cause the jets to unite at a common point on the surface area whereby the jets are jointly atomized and a homogenized carbonated liquid is produced, and collecting the carbonated liquid repelled from the surface and flowing the carbonated liquid towards an outlet under pressure through areas of increasing resistance to the flow.

3. In a process for preparing homogenized carbonated liquid, the step of slantingly directing towards each other and to a common surface area a jet of carbonic acid and a jet of a liquid to be carbonated to cause the jets to unite at a common point on the surface area whereby the jets are jointly atomized and a homogenized carbonated liquid is produced, collecting the carbonated liquid repelled from the surface, and flowing the carbonated liquid towards an outlet for the liquid while increasing the resistance to flow by decreasing the cross-section of the flowing liquid in the direction of the flow.

4. In a process for preparing homogenized carbonated liquid, the step of slantingly directing towards each other and to a common surface area a jet of carbonic acid and a jet of a liquid to be carbonated to cause the jets to unite at a common point on the surface area whereby the jets are jointly atomized and a homogenized carbonated liquid is produced, collecting the carbonated liquid repelled from the surface, flowing the carbonated liquid through area of increasing resistance to the flow towards an outlet, and metering an additional liquid into the flowing carbonated liquid.

5. In an apparatus for the preparation and discharging of homogenized carbonated liquors, the combination of a mixing chamber having an operating valve, a first nozzle and a second nozzle mounted in said mixing chamber with the axes thereof projecting into said chamber and intersecting therein, a perforated surface in said mixing chamber opposite said nozzles and so positioned that the axes of said nozzles intersect at a common point on said perforated surface to form a shock area, a plurality of spaced perforated surfaces positioned on the side of said first perforated surface away from said nozzles, a granular material between said perforated surfaces, a cross-sectional area of said granular material and said perforated surfaces decreasing in a direction away from said shock area to present increasing flow resistance to the passage of the homogenized carbonated liquors from said mixing chamber.

6. In an apparatus for the preparation and discharging of homogenized carbonated liquors, a mixing chamber having an operating valve, a nozzle for liquid and a second nozzle for carbonic acid mounted to be directed into said mixing chamber, means forming a surface having a shock area in said mixing chamber opposite from said nozzles, said nozzles being so mounted that the axes thereof intersect at a common point on said shock area, a carbonic acid supply line leading to said mixing chamber, a branch conduit interconnecting said carbonic supply line with said operating valve, at least one storage container for an additional liquid connected in said branch conduit so that the liquid is carried out by the gas line and the added liquid can be accurately metered, and a pressure reducing valve in said branch conduit between said storage container and said carbonic acid supply line.

References Cited in the file of this patent

UNITED STATES PATENTS

| | | |
|---|---|---|
| 1,889,236 | Burmeister | Nov. 29, 1932 |
| 2,375,833 | Urquhart | May 15, 1945 |